Patented Feb. 2, 1926.

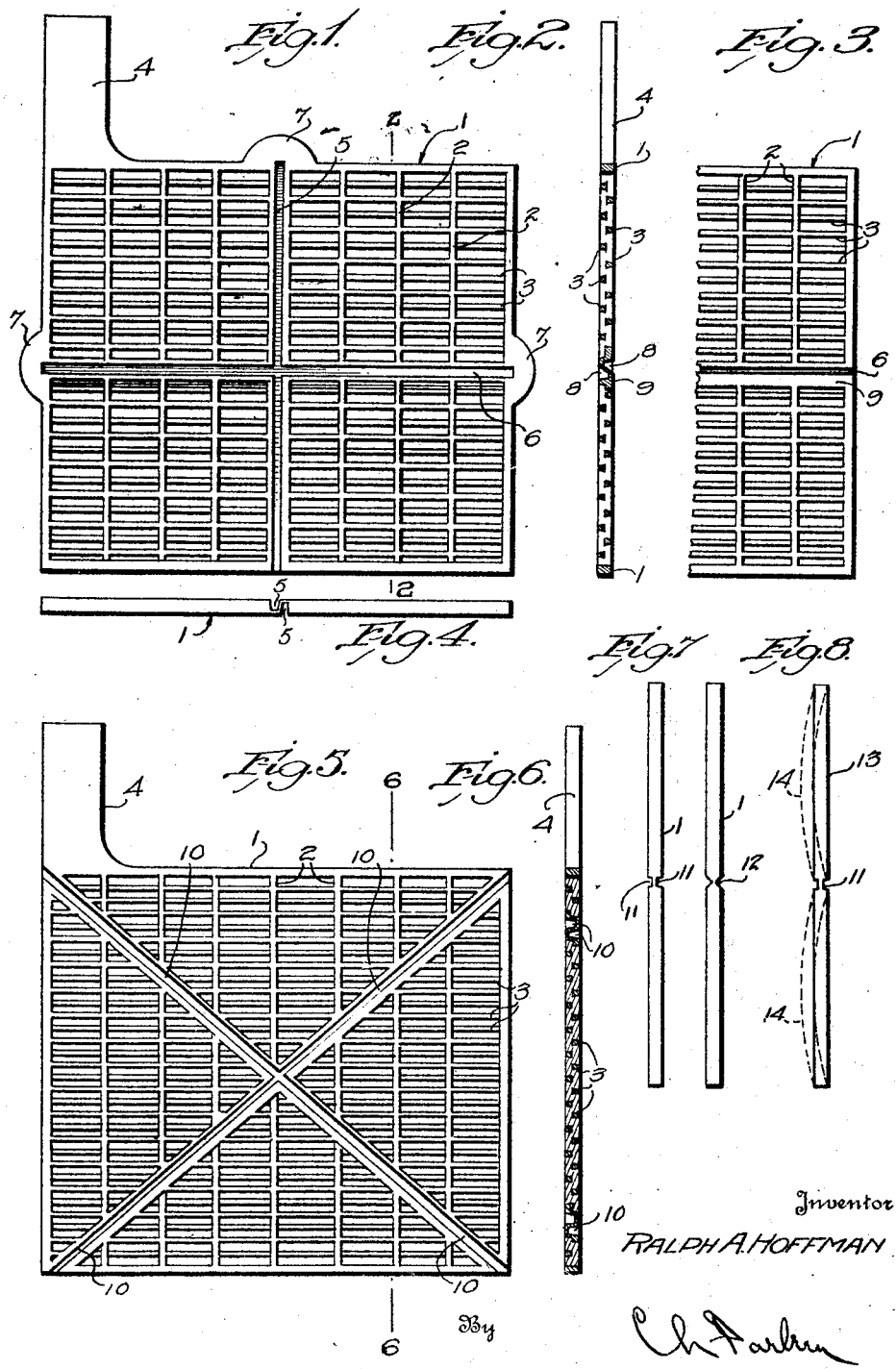

1,571,333

UNITED STATES PATENT OFFICE.

RALPH A. HOFFMAN, OF MARSHALLTOWN, IOWA.

GRID FOR STORAGE BATTERIES.

Application filed October 2, 1923. Serial No. 666,174.

*To all whom it may concern:*

Be it known that I, RALPH A. HOFFMAN, a citizen of the United States, residing at Marshalltown, in the county of Marshall and State of Iowa, have invented certain new and useful Improvements in Grids for Storage Batteries, of which the following is a specification.

This invention relates to grids for storage batteries and more particularly to means for preventing the grids from warping.

In the usual construction of storage batteries, there is provided a series of positive plates having a negative plate arranged on each side of each of the positive plates. The positive plates or grids are generally formed of an alloy of lead and antimony to which the active material, generally lead dioxide, is secured by pasting. The lead dioxide or other active material is arranged in the form of a paste and then placed on the grid. This type of grid is known as the "Faure" plate. In the action of the storage battery, the lead dioxide is changed to lead sulfate and due to the fact that the lead sulfate particles are larger than the particles of lead dioxide, there is a tendency of the plate to warp in case one side of it is more active and undergoes more change than the other side.

In batteries where the greatest efficiency is necessary for the amount of space occupied, as in automobiles, the positive and negative plates are spaced from each other by means of insulators or separators, generally formed of thin wood. The separators must be relatively porous to permit a flow of ions through the solution of the battery between the plates. In the present construction of storage batteries, the warping of the plates frequently pinches the separator and after the separators have been softened by the sulfuric acid or liquid in the battery, the plates frequently pinch through the separators and touch each other, causing short circuiting.

In the present invention, I provide a plate or grid consisting of a plurality of sections connected by flexible joints or hinges which permits the individual sections to warp without pinching or cutting the separator plates. It will be readily seen that the larger the plate, the more curvature will be given in warping to a given angle, and by providing a plate formed of a number of small sections, the warping of each individual section is less serious and the curvature of the plate as a whole is less pronounced.

I preferably connect the sections of the plate by means of thin or weak places in the lead forming the base of the plate which act as flexible joints. These weak points permit the grid to bend in order that a substantially uniform flat position or shape may be maintained by the plate as a whole and thus reduce the strain on the separator caused by the sharp edges of the plates engaging the separator.

In the accompanying drawings, I have shown one embodiment of the invention. In this showing:

Figure 1 is a front elevation of a storage battery plate showing the invention applied, Figure 2 is a vertical sectional view taken on line 2—2 of Figure 1, Figure 3 is a front elevation of a portion of the plate.

Figure 4 is an end elevation,

Figure 5 is a front elevation showing the joints arranged diagonally of the plate, Figure 6 is a vertical sectional view on line 6—6 of Figure 5, Figure 7 is an end elevation showing modified types of joints, and, Figure 8 is an end elevation showing the position of the sections of the plate after use.

Referring to Figures 1 to 4 of the drawings, I have shown a cast plate formed of a suitable alloy of lead and antimony or other suitable material and consisting of an outer frame work 1. The lead forming the frame work is of a substantial thickness as shown in Figure 2 of the drawings. At suitable intervals, the top and bottom of the frame work is connected by vertical bars 2 and the plate is further provided with a plurality of thinner horizontal bars 3 which as shown, are arranged in staggered relation with each alternate bar adjacent the front edge of the frame and the next bar adjacent the rear edge. This is the usual construction of grids and is provided for the purpose of more securely holding the active material, such as the lead dioxide paste to the plate. The plate may be provided with the usual lug 4 by means of which the current is delivered to the plate. In the form of the invention shown in Figures 1 to 4 of the drawings, the plate is provided with two weakened lines or joints. As shown, a vertical joint 5 is arranged centrally of the plate and a horizontal joint 6 is likewise arranged centrally of the plate. In order to permit the lead to flow in the mold, the mold is provided with suitable by-passes to permit the lead to flow around the joints forming extensions or projections 7 on the edges of the plate, which projections may be removed when the plate is ready for assembly in the battery, as shown in Figure 3 of the drawings. Any type of groove may be formed in the lead or other material for the purpose of providing a flexible joint. In the form of the invention shown, the surface is provided with depressions 8 on each side, providing a thin connecting strip 9.

In Figures 5 and 6 of the drawings, there is shown a plate divided into four sections by means of diagonal weakened portions 10. The construction of the plate is otherwise the same as that shown in Figures 1 to 4.

The plate may also be made by casting and then pressing the grooves in the surface of the plate where desired. In forming a plate with pressed grooves, a solid bar of material is formed at the point where the groove is to be during the casting and the plate is then placed under a press and grooved. In Figure 7 of the drawings, I have shown a plate having substantially rectangular grooves 11 and have also shown a plate having diagonal grooves 12. In Figure 8 of the drawings, I have diagrammatically indicated the effect of the weakened portion or groove when the plate warps. In this instance, there is shown a plate 13 before use and in dotted lines, I have shown a plate 14 that has been used and has become warped. An inspection of the drawings will show that if a plate formed in one section were warped to the same extent as the plate 14, the offset from a vertical plane would be greater and by providing the individual sections, the tendency to pinch through the separators is decreased.

The invention may be applied to any construction of grid or plate and any type of groove or flexible joint may be employed in connecting the sections. In the drawings, I have shown a plate divided into four sections but it will be apparent that this division is merely arbitrary and a greater or less number of sections may be provided if desired.

It is to be understood that the form of the invention herewith shown and described is to be taken as a preferred example of the same, and that various changes in the shape, size, and arrangement of parts may be resorted to without departing from the spirit of the invention or the scope of the subjoined claims.

I claim:

1. A storage battery grid comprising a frame, said frame being divided into sections, and flexible joints connecting said sections, each of said joints extending substantially entirely across said frame and intersecting substantially centrally thereof.

2. A storage battery grid comprising a skeleton frame, spaced bars arranged in said frame, and adapted to support the active material, and a second set of bars extending substantially entirely across said frame, said last named bars being connected to said first named bars and provided substantially throughout their length with grooves intersecting substantially centrally of said frame to permit relative movement of the portions of said frame on opposite sides of said bars.

3. A storage battery grid comprising a frame provided with a plurality of straight line weakened portions extending substantially throughout the width and intersecting substantially centrally of said frame to form flexible connections within the portions of said frame on opposite sides of said weakened portions.

4. A storage battery grid comprising an outer frame, a pair of bars arranged at an angle to each other and extending entirely across said frame substantially centrally thereof, said bars being provided with grooves extending substantially throughout the length thereof and forming flexible joints between the sections of said frame.

In testimony whereof, I affix my signature.

RALPH A. HOFFMAN.